(12) United States Patent
Heinrich et al.

(10) Patent No.: US 9,365,134 B2
(45) Date of Patent: Jun. 14, 2016

(54) ADJUSTING DEVICE FOR A SEAT

(71) Applicant: Johnson Controls GmbH, Burscheid (DE)

(72) Inventors: Andreas Heinrich, Heiligenhaus (DE); Thomas Ruckriegel, Burscheid (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/356,848

(22) PCT Filed: Oct. 17, 2012

(86) PCT No.: PCT/EP2012/004335
§ 371 (c)(1),
(2) Date: May 7, 2014

(87) PCT Pub. No.: WO2013/068072
PCT Pub. Date: May 16, 2013

(65) Prior Publication Data
US 2014/0361137 A1    Dec. 11, 2014

(30) Foreign Application Priority Data

Nov. 8, 2011    (DE) .......................... 10 2011 117 905

(51) Int. Cl.
*F16M 13/00*    (2006.01)
*B60N 2/08*    (2006.01)
(Continued)

(52) U.S. Cl.
CPC .. *B60N 2/08* (2013.01); *B60N 2/12* (2013.01); *B60N 2/123* (2013.01); *F16C 1/22* (2013.01); *F16C 1/223* (2013.01)

(58) Field of Classification Search
CPC ........................................................ B60N 2/08
See application file for complete search history.

(56) References Cited

U.S. PATENT DOCUMENTS

| 3,943,794 A | 3/1976 | Shimada |
| 6,105,457 A | 8/2000 | Strasser |
| 6,616,233 B1 * | 9/2003 | Debus et al. .................. 297/341 |

(Continued)

FOREIGN PATENT DOCUMENTS

| AT | 107490 B | 10/1927 |
| CN | 1827421 A | 9/2006 |

(Continued)

OTHER PUBLICATIONS

Office Action dated Mar. 31, 2015, in corresponding Japanese Application No. 2014-540340, 3 pages.

(Continued)

*Primary Examiner* — Amy Sterling
(74) *Attorney, Agent, or Firm* — Foley & Lardner LLP

(57) ABSTRACT

A device for adjusting the position of a seat, in particular of a vehicle seat, has at least one fixing device for securing the position of the seat, which device has at least one locking element, each of which, in the locking position thereof locks at least two guide parts of the device to each other, which are held such that they can move in relation to each other, wherein at least one traction mechanism, with which the locking element can be moved out of the locking position thereof, is coupled to the locking element. A preloading element is associated with the traction mechanism, which preloading element acts directly on a section of the traction mechanism and preloads the traction mechanism without play.

10 Claims, 3 Drawing Sheets

(51) Int. Cl.
*B60N 2/12* (2006.01)
*F16C 1/22* (2006.01)

(56) References Cited

U.S. PATENT DOCUMENTS

| | | | |
|---|---|---|---|
| 7,009,353 B2 * | 3/2006 | Dewert | 318/467 |
| 7,222,918 B2 | 5/2007 | Bronner et al. | |
| 8,967,583 B2 * | 3/2015 | Stoia | 248/429 |
| 2005/0104433 A1 | 5/2005 | Ganot | |

FOREIGN PATENT DOCUMENTS

| | | |
|---|---|---|
| DE | 2708423 C2 | 9/1977 |
| DE | 102004015451 A1 | 10/2005 |
| DE | 102004015450 A1 | 11/2005 |
| DE | 102006054855 A1 | 5/2008 |
| EP | 1528032 A1 | 5/2005 |
| FR | 2910085 A1 | 6/2008 |
| JP | 62-029439 A | 2/1987 |
| JP | 01-133039 | 5/1989 |
| JP | 11-334430 A | 12/1999 |
| JP | 11-342773 A | 12/1999 |
| JP | 2010-074872 A | 4/2010 |

OTHER PUBLICATIONS

Office Action dated Mar. 23, 2015 in corresponding Korean application No. 10-2014-7015556 and English translation, 9 pages.
International Search Report received in PCT/EP2012/004335.
German Office Action dated Jun. 14, 2012 received in corresponding German Application No. 10 2011 117 905.8 filed Nov. 8, 2011.
Office Action dated Sep. 22, 2015, in corresponding Chinese application No. 201280065694.6, 7 pages.

* cited by examiner

ADJUSTING DEVICE FOR A SEAT

CROSS REFERENCE TO RELATED APPLICATIONS

The present application is a National Stage of International Application No. PCT/EP2012/004335 filed on Oct. 17, 2012, which claims the benefit of German Patent Application No. 10 2011 117 905.8 filed on Nov. 8, 2011, the entire disclosure of which are incorporated herein by reference.

The invention relates to a device for adjusting the position of a seat, in particular a vehicle seat, with at least one fixing device for securing the position of the seat, which exhibits at least one locking element that in its locking position respectively locks at least two guide parts of the device, which are held so that they can move relative to each other, wherein the locking element has coupled to it at least one traction means, with which the locking element can be moved out of its locking position. In addition, the invention relates to a seat, in particular a vehicle seat, with at least one movably held seat section, such as seat cushions or the like, which has allocated to it at least one device for adjusting the position of the seat.

Known devices for adjusting the position of a seat primarily find application in vehicle seats, and are normally used in two-door vehicles, so as to make it easier to sit down on the rear seats of the vehicle. In order to enable entry into the back seat of the vehicle by means of such devices for adjustment or adjusting means, also known as easy-entry mechanical systems, the backrest of the front seat is first swiveled forward by a specific angle, wherein once a specific angle of inclination has been reached, the seat cushion together with the backrest can be moved or shifted toward the front.

Such a device for adjusting the position of a seat is known among other publications from DE 10 2004 048 737 A1, and encompasses at least one fixing device for securely locking the position of the seat. The fixing device exhibits at least one locking element, with which at least two guide parts of the adjusting device that can be moved relative to each other can be locked together when the locking element is in its locking position. The locking element has coupled to it a traction means, for example which is actuated via the swiveling backrest, and with which the locking element is moved out of its locking position. This makes it possible to again shift the guide parts as a rule designed as rail elements of a guide toward each other, so that the seat can then be easily adjusted. The traction means has allocated to it a helical spring, which is in contact with a sheath that protects the traction means, and allows the sheath to move in particular when the traction means is overloaded, wherein the helical spring is compressed in the process. Under unfavorable conditions, however, a material failure in the area of the helical spring might cause the self-relaxing helical spring to inadvertently actuate the traction means, so that locking between the guide parts of the adjusting device is no longer assured.

Therefore, the object of the invention is to improve a device of the generic type described above so as to always reliably preclude an inadvertent actuation of the traction means, and hence the locking element.

According to the invention, the object is achieved by a device with the features in claim 1. Advantageous further developments and embodiments of the invention are indicated in claims 2 to 10.

In a device for adjusting the position of a seat, in particular a vehicle seat, which exhibits at least one locking element that in its locking position respectively locks together at least two guide parts of the device, which are held so that they can move relative to each other, wherein the locking element has coupled to it at least one traction means, with which the locking element can be moved out of its locking position, the invention provides that the traction means have allocated to it a preloading element, which acts directly on a section of the traction means, and thereby preloads the traction means free of play.

On the one hand, such a preloading element that acts on the traction means as described in the invention ensures an advantageous balancing of possible length differences between the traction means used for assembly on the adjusting devices. When the preloaded traction means is actuated, a tensile force thus always acts directly on the locking element, which can be joined directly with the traction means. On the other hand, the preloading element acting directly on the traction means, in particular in a case where the locking element has already been completely unlocked and a force is also exerted on the traction means, which is referred to as excess travel, advantageously permits an offsetting motion opposite the preloading direction. As a result, the tensile force acting in the traction means is advantageously limited, and potential damage to the traction means or components of the adjusting device operatively interacting therewith is simultaneously avoided. For example, the preloading element can be a roller that acts directly on the traction means from the upper side under its own weight, wherein the circumferential surface of the roller abuts against the traction means. Given an excess travel acting on the traction means, the traction means extends into the area of the roller, simultaneously lifting it in the process.

An advantageous further development of the invention provides that the preloading element exhibit at least one spring element, the spring force of which deflects at least sections of the traction means coupled with the locking element roughly transverse to its direction of extension. Using a spring element that generates a spring force directed perpendicular to the tensile force acting inside the traction means is an advantageously easy way to realize a preloading element. The traction means is deflected transverse to its direction of extension by the spring force, so that when the traction means is actuated, the locking element possibly connected directly thereto is moved out of its locking position, depending on the spring constant of the spring element. The spring element used can be a tension spring, for example, one end of which can accommodate a guide roller, for example, which is used to guide the traction means during its adjustment motion.

The preloading element can here encompass a guide structure that accommodates the traction means via a section on which the preload-generating spring element acts through the transfer of force. This ensures that the traction means is always reliably guided, and can correspondingly slide with almost no friction along the guide structure despite the spring force acting transversely thereto. In addition, it is advantageously ensured that the spring element always be oriented perpendicular to the traction means, so that the spring force generated by the spring element is optimally introduced into the traction means. As mentioned above, the guide structure can be a guide roller, which advantageously results in low friction values. It is also conceivable for the guide structure to be designed similarly to a curved arm, which is pivoted at one end. One side of the curved arm has a guide surface for the traction means, while the side opposite the guide surface then acts on the spring element, for example exerting a compressive force on the curved arm.

In particular, the traction means can be divided by at least one section into two partial strands, wherein the spring element is connected to the latter so as to transmit a force between the partial strands running at specific angles to each other. Dividing the traction means into two partial strands yields an advantageously frictionless alternative to using a guide structure that acts on the traction means. The partial strands here preferably run in a single plane and in the form of a rhombus, so that opposing sections of both partial strands run parallel to each other. The arising corner points here form nodal points, wherein the spring element is situated between two opposing nodal points, along the diagonal extending transverse to the direction of movement. Depending on the spring constant and possibly varying length of the traction means, the nodal points lying at the ends of the spring element are pressed correspondingly far apart. When the traction means is actuated, there are circumstances in which the spring element is first pressed together somewhat until the spring force exceeds the tensile force needed to unlock the locking element. While the entire traction means along with the locking element is moved out of its direction of movement, the nodal points on both sides of the spring element then remain at roughly a constant distance from each other. After the locking element has been released from its locking position, the guide parts can now be moved toward each other.

A further development of the invention provides that the preloading element exhibit a spring element designed in particular as a compression spring. Using a compression spring provides a structurally simple way to build up a specific preloading force on the spring element that generates the traction means. The compression spring is preferably designed as a helical spring, and can here be used both in conjunction with the traction means exhibiting the partial strands, and together with the guide structure acting on the traction means. In the case of a compression spring, it is possible that the spring body might have to be guided to prevent the spring body from kinking laterally outward under a correspondingly high load when its ends are exposed to a compressive force.

As an alternative to the spring element acting in particular perpendicularly on a section of the traction means, the preloading element can likewise be a spring element that in particular joins the free end of the traction means with the locking element being released from its locking position, at least so as to transfer a force. An optimal level of operational reliability is always ensured by configuring or arranging the spring element according to the invention as a coupling element between the locking element, which reliably [secures] the guide parts relative to each other, and the traction means, which allows the locking element to be released from its locking position. Any failure experienced by one of the components in the fixing device here advantageously also does not cause the fixing device to be inadvertently triggered or released. The spring element used here in particular tensions the traction means in the direction of extension against the direction of force acting on the traction means. Even if the traction means is inadvertently exposed to excess travel, the spring element coupling the traction means and locking element can intercept the additional tensile force without there being any risk of possible damage to the components of the adjusting device. The spring element and locking element can exhibit a direct connection with each other, or be joined together by additional structural parts.

The respective end sections of the spring element are here preferably coupled with the traction means and locking means, which offers an advantageous way to utilize all of the spring force stored in the spring element. Coupling via the end sections also allows the spring element to counteract or intercept the tensile force acting on its spring ends over its entire spring range.

It lies within the framework of the invention that the spring element be a spiral spring situated in a housing, and that the traction means be designed as a Bowden cable, wherein the Bowden cable is equipped with at least one sheath section that is supported against the housing. The outer end of the spiral spring acts directly on the free end of the traction means, and steers the latter in roughly its direction of extension, thereby generating a preload with an advantageous effect. The inner end of the spiral spring can be joined in a torque-proof manner with a fixed point inside the housing, for example. The spring body spirally coiling around the fixed point in one plane here generates a torque around the fixed point of the housing. By contrast, the sheath section located around the Bowden cable yields a counter-bearing on the housing, so that the relative movement between the traction means and housing is advantageously limited. Provided inside the housing is a stop for the spring element coiling around the fixed point, so as to limit the preload for the traction means on the one hand, and ensure a fixed stop to limit the spring range for the spring element on the other.

Another further development of the invention provides that the locking element be coupled with the periphery of the housing. Arranging or forming the locking element on the housing ensures a structurally simple configuration for the fixing device. In addition, the process of locking the guide parts of the adjusting device by means of the locking element situated on the housing is always reliable. Depending on the spring constant, the tensile force acting on the traction means either first deforms the spring element designed as a spiral spring by a predetermined amount, and then adjusts the housing with the locking element located thereon, or directly moves the locking element out of the locking position upon actuation of the traction means, and thus only deforms the coiled spring element after an excess travel has been generated. The locking element can here be designed as a recess or detent projecting on the periphery of the housing, wherein the locking element automatically moves back into its locking position once the traction means is no longer exposed to a tensile force. The housing can here be pivoted to a structural part of the fixing device. It is also conceivable that the inner end of the spiral spring be in particular rotatably configured relative to the fixed housing, and coupled with the separately designed locking element, so that the spiral spring releases the locking element given a movement by the traction means.

In the case of a seat, in particular a vehicle seat, with at least one movably held seat section, such as a seat cushion or the like, which has allocated to it at least one device for adjusting the position of the seat, for which independent protection is being sought, the invention provides that the device be an adjusting device according to one of claims 1 to 9.

The advantage to using an adjusting device designed according to the invention on one of the front vehicle seats in particular of a two-door vehicle is that an advantageously functionally reliable easy-entry mechanical system can be realized, which when activated prevents damage to the adjusting device, and hence precludes inadvertent actuations. In particular, the adjusting device according to the invention is triggered by swiveling the backrest on the driver or passenger seat of the vehicle. After the backrest has reached a corresponding angle of inclination, the entire vehicle seat can be moved into its frontmost position.

The drawing depicts possible exemplary embodiments of the invention, which yield additional inventive features. Shown on:

Figure 1:
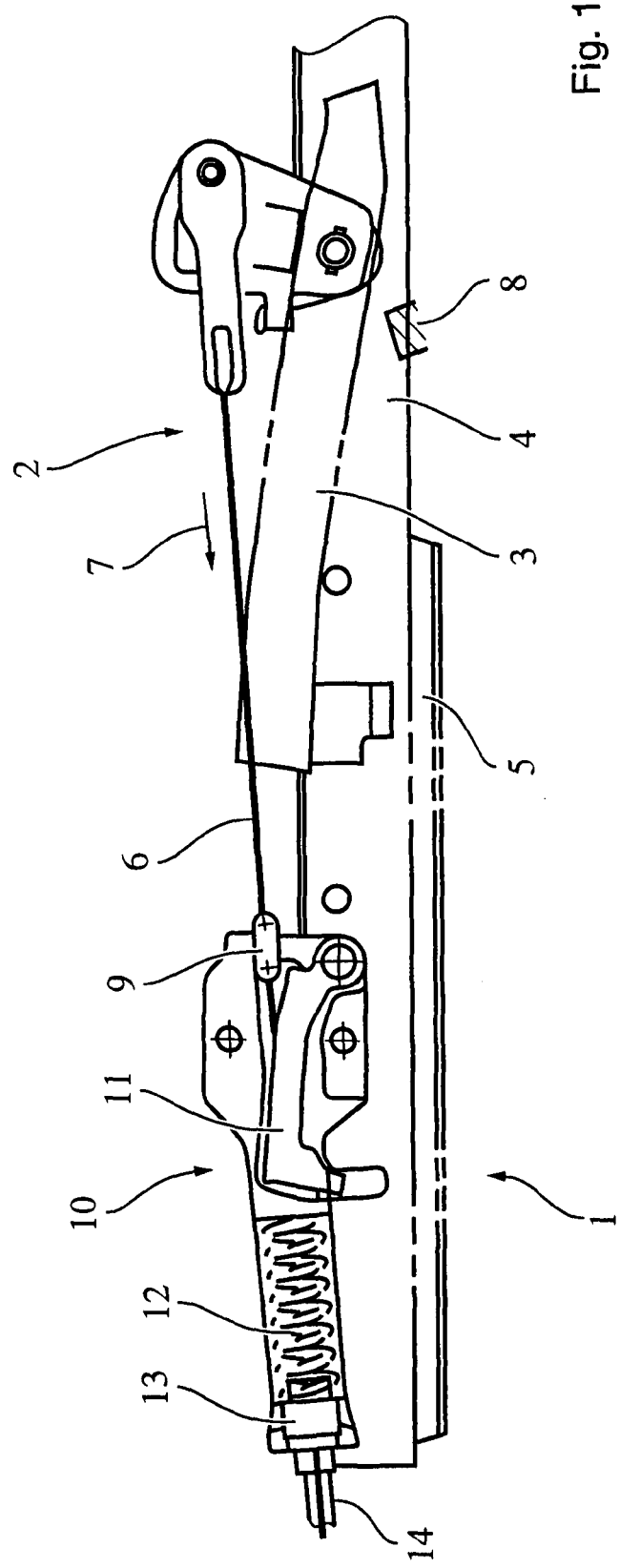
FIG. 1 is an adjusting device from prior art.

An adjusting device known from prior art for a vehicle seat (not shown in any more detail) is marked 1, wherein the adjusting device 1 encompasses at least one fixing device 2. The fixing device 2 exhibits at least one locking element 3 here designed as a lever, which in its locking position locks together two guide parts 4, 5 of the device 1, which are held so that they can move relative to each other. The locking element 3 is coupled with a traction means 6 designed as a Bowden cable, wherein the locking element is moved downwardly in the direction of arrow 7 until it hits the stop 8 when the traction means 6 is actuated. It becomes unlocked as a result, so that the guide parts 4, 5 comprising part of the seat rail of the seat can be moved toward each other. At the same time, a slide stone 9 rigidly secured to the traction means 6 is moved, and acts on a second adjusting mechanism 10 that performs a memory function for the easy-entry mechanical system. The adjusting mechanism 10 exhibits a lever 11 actuated by the slide stone 9, and ensures that, after the backrest has been tilted forward and the entire seat has been moved forward, the guide parts are locked in the same position relative to each other as before they were unlocked when the seat is subsequently moved back. A predetermined section is provided with a helical spring 12, which is made to abut against a sheath 14 for the traction means 6 designed as a Bowden cable by way of a bracket 13 designed as a counter bearing. In particular, the helical spring offsets an excess travel by the traction means, wherein the bracket 13 then shifts against the actual direction of actuation (arrow 7).

Figure 2:
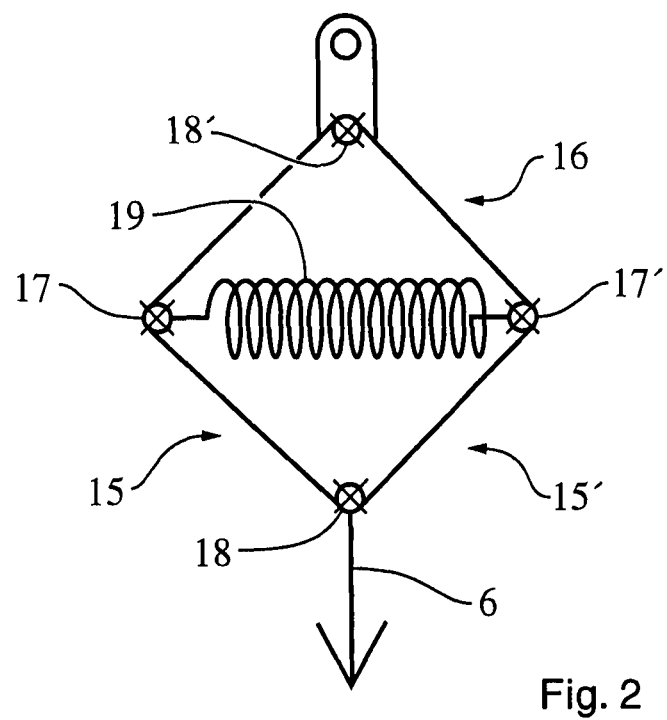
FIG. 2 is a view of a first exemplary embodiment of a traction means preloaded according to the invention.

FIG. 2 presents a first embodiment according to the invention for preloading the traction means, with which the traction means can be preloaded for an advantageous actuation, and an excess travel can be simultaneously offset in an advantageously easy manner given an excessive tensile load. To this end, the traction means 6 is divided into two partial strands 15, 15', which are arranged similarly to a rhombus, thereby yielding sections that in particular run parallel to each other. Situated between the partial strands 15, 15' is a preloading element 16, with which the nodal points 17, 17' joined with the preloading element 16 are pressed to the outside, i.e., transverse to the extension of the traction means 6, so that the nodal points 18, 18' move toward each other. The nodal point 18 establishes the connection to the remaining traction means 6, and nodal point 18 can provide a direct link to the locking element 3 (not shown in any more detail) (FIG. 1). In the embodiment depicted, the preloading element 16 is a spring element 19 designed as a compression spring.

Figure 3:
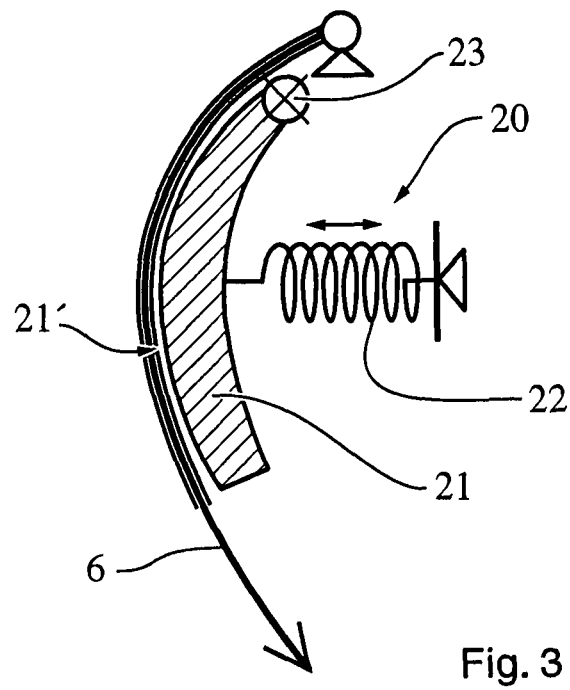
FIG. 3 is a view of a second exemplary embodiment of a traction means preloaded according to the invention.

FIG. 3 presents another embodiment for a used preloading element 20 according to the invention, which again acts directly on the traction means 6, during which the traction means 6 is deflected over at least one section transverse to its direction of extension. The preloading element 20 exhibits a guide structure 21 that accommodates a section of the traction means 6, and a spring element 22 that acts on the guide structure 21 and is oriented roughly perpendicular to the direction of extension of the traction means 6. The guide structure 21 exhibits a guide surface 21' for the traction means 6, which is guided along the guide surface, preferably without friction. The spring element 22 is also designed as a pressure-loaded helical spring. The guide structure 21 is held so that it can swivel via the pivot point 23.

Figure 4:
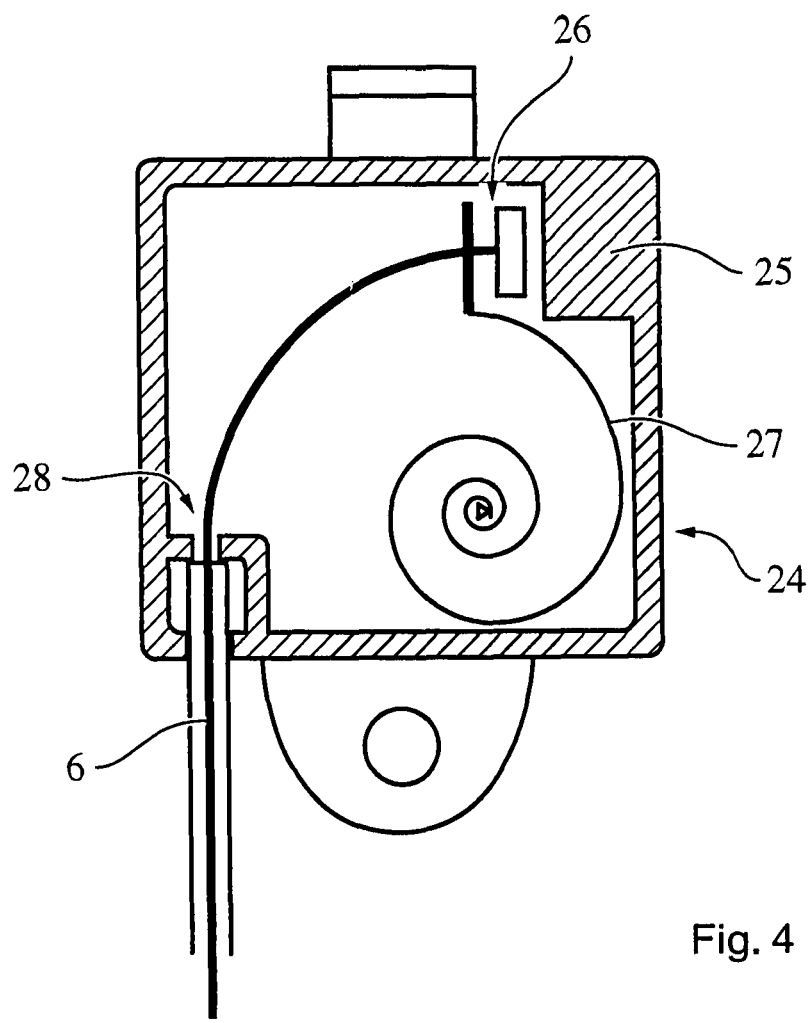
FIG. 4 is a view of another exemplary embodiment of a traction means preloaded according to the invention.

FIG. 4 presents another embodiment for a traction means 6 preloaded with a preloading element 24. The traction means 6 is here guided into a housing 25, and its free end 26 is directly joined with an end of a spring element 27 designed as a spiral spring. The sheath 14 accommodating the traction means 6 abuts against a region of the housing 25. When the traction means 6 is actuated, its end 26 is pulled in the direction of the housing opening 28, making it possible to initiate an actuation of the locking element 3 (FIG. 1), for example which is coupled with the housing 25.

The invention claimed is:

1. A device for adjusting the position of a seat, comprising:
at least two guide parts held so that the at least two guide parts can move relative to each other to guide adjustment of the seat;
at least one fixing device including at least one locking element that in a locking position respectively locks together the at least two guide parts to secure the position of the seat;
at least one traction mechanism coupled to the locking element, with which traction mechanism the locking element can be moved out of its locking position; and
a preloading element connected to the traction mechanism, wherein the preloading element acts directly on a section of the traction mechanism and preloads the traction mechanism free of play,
wherein the preloading element includes at least one spring element, the spring force of which deflects at least sections of the traction mechanism coupled with the locking element roughly transverse to its direction of extension,
wherein the traction mechanism includes at least one section divided into a first partial strand and a second partial strand, and the traction mechanism also includes a remaining traction section,
wherein the traction mechanism includes a first connection point disposed at an end point of the traction mechanism and a second connection point disposed at an end point of the remaining traction section, wherein the end point of the traction mechanism and the end point of the remaining traction section are separate,
wherein the first and second partial strands each extend between and directly connect to both the first connection point and the second connection point,
wherein a first nodal point is positioned along the first partial strand between the first connection point and the second connection point,
wherein a second nodal point is positioned along the second partial strand between the first connection point and the second connection point,
wherein the spring element is connected to and extends between the first nodal point and the second nodal point, and
wherein the first and second partial strands extend at specific angles relative to each other from each of the first and second connection points so as to transfer force.

2. The device according to claim 1, wherein the preloading element includes a guide structure that accommodates the traction mechanism via a section on which the spring element acts.

3. The device according to claim 1, wherein the preloading element includes a spring element designed as a compression spring.

4. The device according to claim 1, wherein the preloading element is a spring element, which joins the free end of the traction mechanism with the locking element being released from its locking position so as to transfer forces.

5. The device according to claim 4, wherein the respective end sections of the spring element are coupled with the traction mechanism and locking element.

6. The device according to claim 4, wherein the spring element is a spiral spring situated in a housing, and the traction mechanism is designed as a Bowden cable, wherein the Bowden cable is equipped with at least one sheath section that is supported against the housing.

7. The device according to claim 6, wherein the locking element is coupled with the periphery of the housing.

8. A seat comprising:
at least one movably held seat section,
wherein the seat section includes at least one adjusting device for adjusting the position of the seat, wherein the adjusting device includes
at least two guide parts held so that the at least two guide parts can move relative to each other to guide adjustment of the seat,
at least one fixing device including at least one locking element that in a locking position respectively locks together the at least two guide parts to secure the position of the seat,
at least one traction mechanism coupled to the locking element, with which traction mechanism the locking element can be moved out of its locking position, and
a preloading element connected to the traction mechanism, wherein the preloading element acts directly on a section of the traction mechanism and preloads the traction mechanism free of play,
wherein the preloading element includes at least one spring element, the spring force of which deflects at least sections of the traction mechanism coupled with the locking element roughly transverse to its direction of extension,
wherein the traction mechanism includes at least one section divided into a first partial strand and a second partial strand, and the traction mechanism also includes a remaining traction section,
wherein the traction mechanism includes a first connection point disposed at an end point of the traction mechanism and a second connection point disposed at an end point of the remaining traction section, wherein the end point of the traction mechanism and the end point of the remaining traction section are separate,
wherein the first and second partial strands each extend between and directly connect to both the first connection point and the second connection point,
wherein a first nodal point is positioned along the first partial strand between the first connection point and the second connection point,
wherein a second nodal point is positioned along the second partial strand between the first connection point and the second connection point,
wherein the spring element is connected to and extends between the first nodal point and the second nodal point, and
wherein the first and second partial strands extend at specific angles relative to each other from each of the first and second connection points so as to transfer force.

9. The device according to claim 1, wherein the spring element extends between the first and second partial strands in a direction substantially perpendicular to a direction of extension of the remaining traction section.

10. The device according to claim 1, wherein a first end of the spring element is connected to the first nodal point in the first partial strand and a second end of the spring element is connected to the second nodal point in the second partial strand such that the spring element extends between and separates the first nodal point and the second nodal point.

* * * * *